US012328023B2

(12) United States Patent
Casto (10) Patent No.: US 12,328,023 B2
(45) Date of Patent: Jun. 10, 2025

(54) PORTABLE POWER SOURCE

(71) Applicant: VCM Solutions Inc., Mississauga (CA)

(72) Inventor: Ven Casto, Mississauga (CA)

(73) Assignee: VCM Solutions Inc., Mississauga (CA)

( * ) Notice: Subject to any disclaimer, the term of this patent is extended or adjusted under 35 U.S.C. 154(b) by 0 days.

(21) Appl. No.: 18/401,356

(22) Filed: Dec. 30, 2023

(65) Prior Publication Data

US 2024/0136838 A1 Apr. 25, 2024

Related U.S. Application Data

(63) Continuation of application No. 17/498,493, filed on Oct. 11, 2021, now Pat. No. 11,594,905, and a continuation of application No. 18/114,233, filed on Feb. 25, 2023, now abandoned, which is a continuation of application No. 17/498,493, filed on Oct. 11, 2021, now Pat. No. 11,594,905.

(60) Provisional application No. 63/089,609, filed on Oct. 9, 2020, provisional application No. 63/186,543, filed on May 10, 2021, provisional application No. 63/461,550, filed on Apr. 24, 2023.

(51) Int. Cl.
*H02J 7/00* (2006.01)
*H01M 50/207* (2021.01)
*H02J 7/34* (2006.01)
*H02J 9/06* (2006.01)
*H02M 7/538* (2007.01)

(52) U.S. Cl.
CPC ......... *H02J 7/0063* (2013.01); *H01M 50/207* (2021.01); *H02J 7/342* (2020.01); *H02J 9/062* (2013.01); *H02M 7/53803* (2013.01); *H02J 2207/20* (2020.01)

(58) Field of Classification Search
CPC .......... H02J 7/0063; H02J 7/342; H02J 9/062; H02J 2207/20; H02J 7/0042; H01M 50/207; H01M 10/441; H01M 50/204; H01M 50/249; H01M 50/298; H01M 2220/20; H02M 7/53803; Y02E 60/10
USPC .......................................................... 307/64
See application file for complete search history.

(56) References Cited

U.S. PATENT DOCUMENTS

2014/0097680 A1\* 4/2014 Navarro .................... H02J 9/06
307/23

FOREIGN PATENT DOCUMENTS

JP 2018129954 \* 8/2018

\* cited by examiner

*Primary Examiner* — Richard Tan
(74) *Attorney, Agent, or Firm* — Head, Johnson, Kachigian & Wilkinson, PC (57) ABSTRACT

An apparatus for defining an AC power source having a predetermined amperage rating and for use with a pallet truck or fork lift lifting device. The apparatus includes a pair of terminal banks, a battery, a converter adapted to change DC to AC power, a relay, a controller, and a base adapted for engagement by the lifting device for transport of the apparatus. The apparatus is shaped so that it can be transported by the lifting device through a doorway. A pair of terminal banks, battery, converter, relay and controller are coupled to one another and configured for selective operation in a standalone configuration or a stacked configuration.

4 Claims, 8 Drawing Sheets

Standalone configuration
island mode

FIG.5

Stacked configuration
island mode

FIG.6

Standalone configuration
coupled mode

PORTABLE POWER SOURCE

CROSS-REFERENCE TO RELATED APPLICATIONS

This application is a continuation-in-part application of U.S. patent application Ser. No. 18/114,233 filed Feb. 25, 2023, which claims priority to U.S. patent application Ser. No. 17/498,493 filed Oct. 11, 2021, now U.S. Pat. No. 11,594,905, which claims priority to U.S. Provisional Patent Application Ser. No. 63/089,609 filed Oct. 9, 2020, and U.S. Provisional Patent Application Ser. No. 63/186,543 filed May 10, 2021. This application further claims priority to U.S. Provisional Patent Application Ser. No. 63/461,550 filed Apr. 24, 2023.

BACKGROUND OF THE INVENTION

1. Field of the Invention

The invention relates to the field of portable power supply.

2. Prior Art

Portable generators are commonly used to provide temporary electrical power. For example, only, generators are often used at construction sites and at concerts.

SUMMARY OF THE INVENTION

Forming one aspect of the invention is apparatus for defining an AC power source having a predetermined amperage rating and for use with a lifting device selected from the group consisting of pallet truck and fork lift.

The apparatus comprises: a pair of terminal banks; a battery; a converter adapted to change DC power to AC power; a relay; a controller; and a base; and a shape.

The converter is adapted to change DC power to AC power.

The base is adapted for engagement by the lifting device for transport of the apparatus.

The shape is such that the apparatus can be transported by the lifting device through a doorway that is 32" wide and 80" high.

The pair of terminal banks, battery, converter, relay and controller are operatively coupled to one another and configured for selective operation in one of a standalone configuration and a stacked configuration.

In the standalone configuration, one of the pair of terminal banks defines an AC power supply using AC power generated by the converter and the other of the pair of terminal banks is isolated from the converter.

In the stacked configuration, one of the pair of terminal banks is coupled to an external AC power supply and the other of the pair of terminal banks defines an AC power supply using AC power both generated by the converter and provided by the external AC power supply and having a load capacity equal to the maximum of: (i) the combined load capacity of the external AC power supply and the converter; and (ii) the predetermined amperage rating.

According to another aspect, the pair of terminal banks, battery, converter, relay and controller can be operatively coupled to one another and configured, when coupled to an external load and in each of the standalone configuration and the stacked configuration, for selective operation in one of:

a coupled mode, wherein the waveform of the AC power produced by the converter is synchronized by the controller responsive to the external load; and an island mode, wherein the waveform produced is independent of the external load According to another aspect, the apparatus can be adapted to permit a plurality of the apparatus to be coupled to one another in a power array wherein one of the plurality is a master and is coupled to an external load, the master operating in the stacked configuration and receiving power from the one or more other apparatus of the plurality of the power array; and the one or more other apparatus of the plurality of the power array are slaves, each being connected to one other of the apparatus of the plurality to deliver power thereto and operating in the coupled mode, the one other of the apparatus of the plurality to which said each is connected defining the external load to which the waveform is synchronized.

According to another aspect, the master can be adapted for selective operation in one of the coupled mode and the island mode.

According to another aspect, the converter can include a rectifier and the apparatus can be further adapted to permit a plurality of the apparatus to be coupled to one another in a charging array wherein: one of the plurality of the charging array is coupled to an external AC power supply; the others of the plurality of the charging array receive AC power from the one.

According to another aspect, the apparatus can form part of a system also comprising cables and cable shrouds, each cable being rated for the predetermined amperage rating and adapted to provide for the apparatus forming the power array to be coupled to one another to form the power array and the shrouds adapted to protect cords from lightweight traffic when traversing traffic corridors.

According to another aspect, the plurality of apparatus forming the power array can be user selectable between 2 and 8.

According to another aspect, each apparatus can: have a unique identifier; have a functionality to permit user entry of a unique identifier; have an ADD SLAVE TO STACK functionality to enable the addition of a slave to a master; and be adapted to permit assembly into a 2-unit power array by following the following steps:

operatively connecting the input terminals of an apparatus to be master to the output terminals of an apparatus to be slaved;

selecting the ADD SLAVE TO STACK functionality on the apparatus to be master; and entering the unique identifier of the apparatus to be slaved.

According to another aspect, each apparatus can be adapted to permit slaves to be added to a power array by following the following steps:

operatively connecting the output terminals of an apparatus to be added as slave to the input terminals of the last slave in the array;

selecting the ADD SLAVE TO STACK functionality on the apparatus to be master; and entering the unique identifier of the apparatus to be slaved.

According to another aspect, each apparatus can have a functionality to REMOVE SLAVE FROM STACK functionality to enable the removal of a slave to a stack and is adapted to permit slaves to be removed from a power array by following the following steps:

selecting the REMOVE SLAVE FROM STACK FUNCTIONALITY on the Master; and disconnecting the output terminals of the last slave in the array.

According to another aspect, each apparatus can be adapted such that, the REMOVE SLAVE FROM STACK functionality is enabled only in respect of a Master in an array, and such that the ADD SLAVE TO STACK is disabled in respect of any slave in an array.

According to another aspect, each apparatus can be adapted such that the ADD SLAVE TO STACK is disabled in respect of a Master when the additional of a further apparatus to the array would result in the combined load capacities of the apparatus in the array exceeding the predetermined amperage rating.

Advantages, features and characteristics of the invention will become evident upon review of the following detailed description with reference to the appended drawings, the latter being briefly described hereinbelow.

BRIEF DESCRIPTION OF THE DRAWINGS

FIG. 4.1 is a bottom view of the apparatus of FIG. 1;

DETAILED DESCRIPTION OF THE PREFERRED EMBODIMENTS

A non-limiting example of apparatus 20 according to the invention is shown in FIG. 1 through FIG. 4.1 and will be understood to have: a pair of terminal banks 22; a battery 24; a relay 26; a controller 28; a base 30; and a shape 32.

Each terminal bank includes five connectors 34 of the Cam-Lok style: three of those connectors are each associated with one power phase, one is associated with neutral and one with ground.

Figure 3:
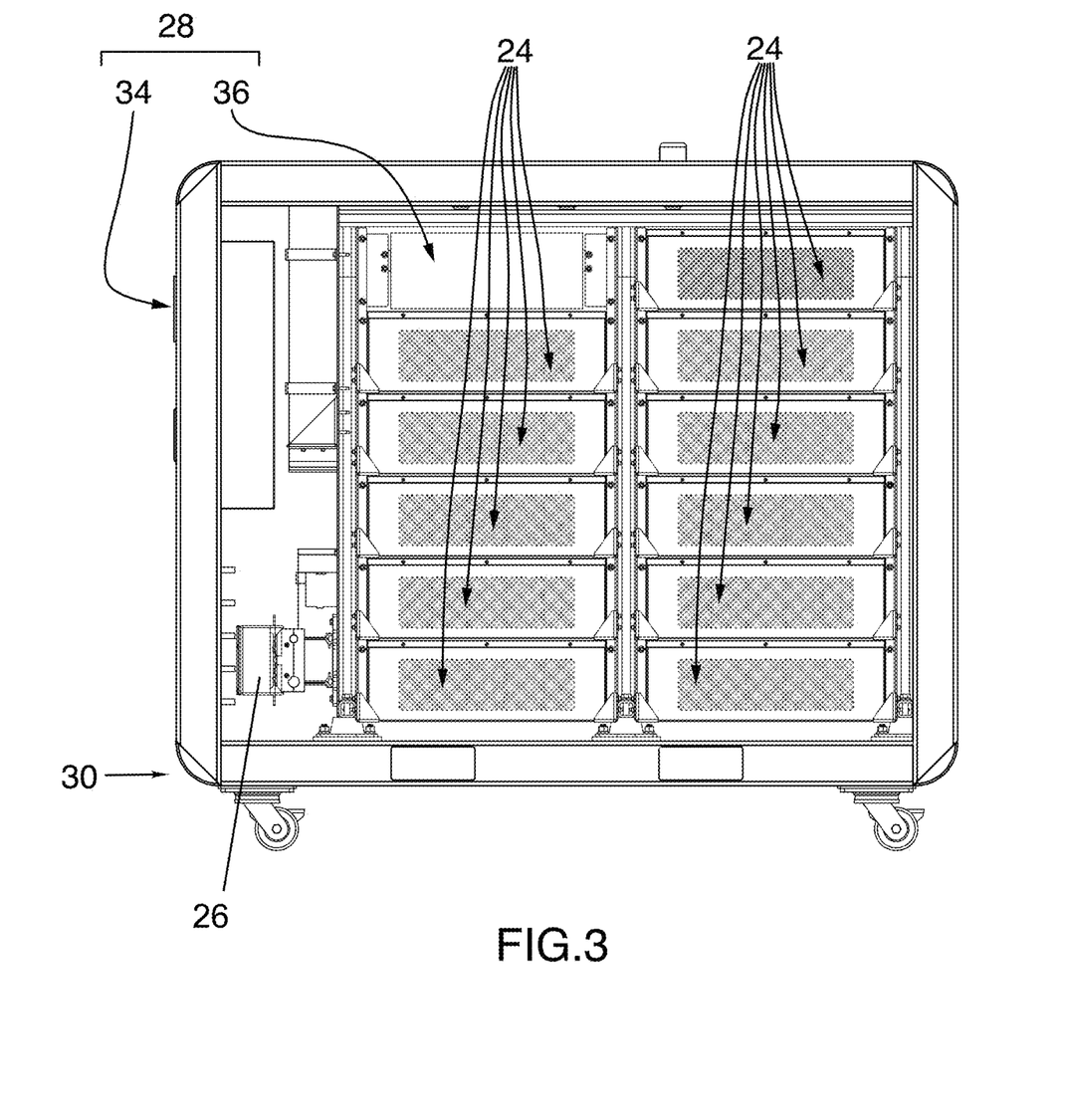
FIG. 3 is a side X-ray view of the apparatus of FIG. 1.
Figure 4:
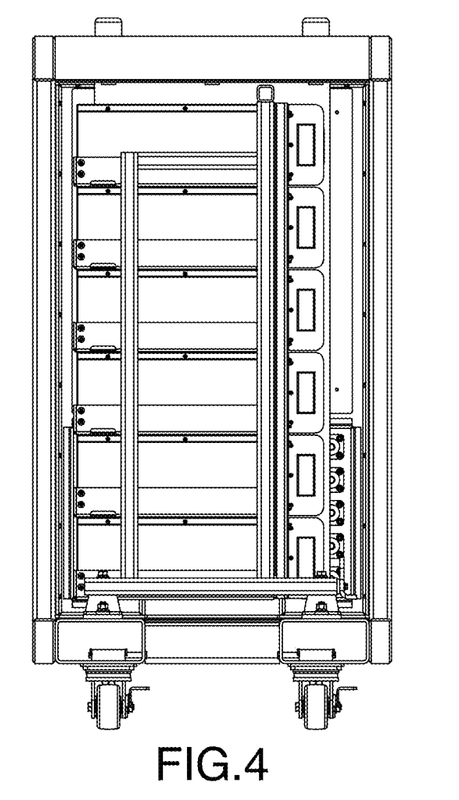
FIG. 4 is a rear X-ray view of the apparatus of FIG. 1.

The battery is a plurality (11) cells collectively storing 50 KWH of usable DC power (LiFePO4 52V 100 Ahr modules)

The converter is a BiDirectional Power Conversion System (PCS) including a 40 KW/50 A inverter and a 40 KW/50 A rectifier.

The relay is coupled to selectively isolate one of the terminal banks.

Figure 1:
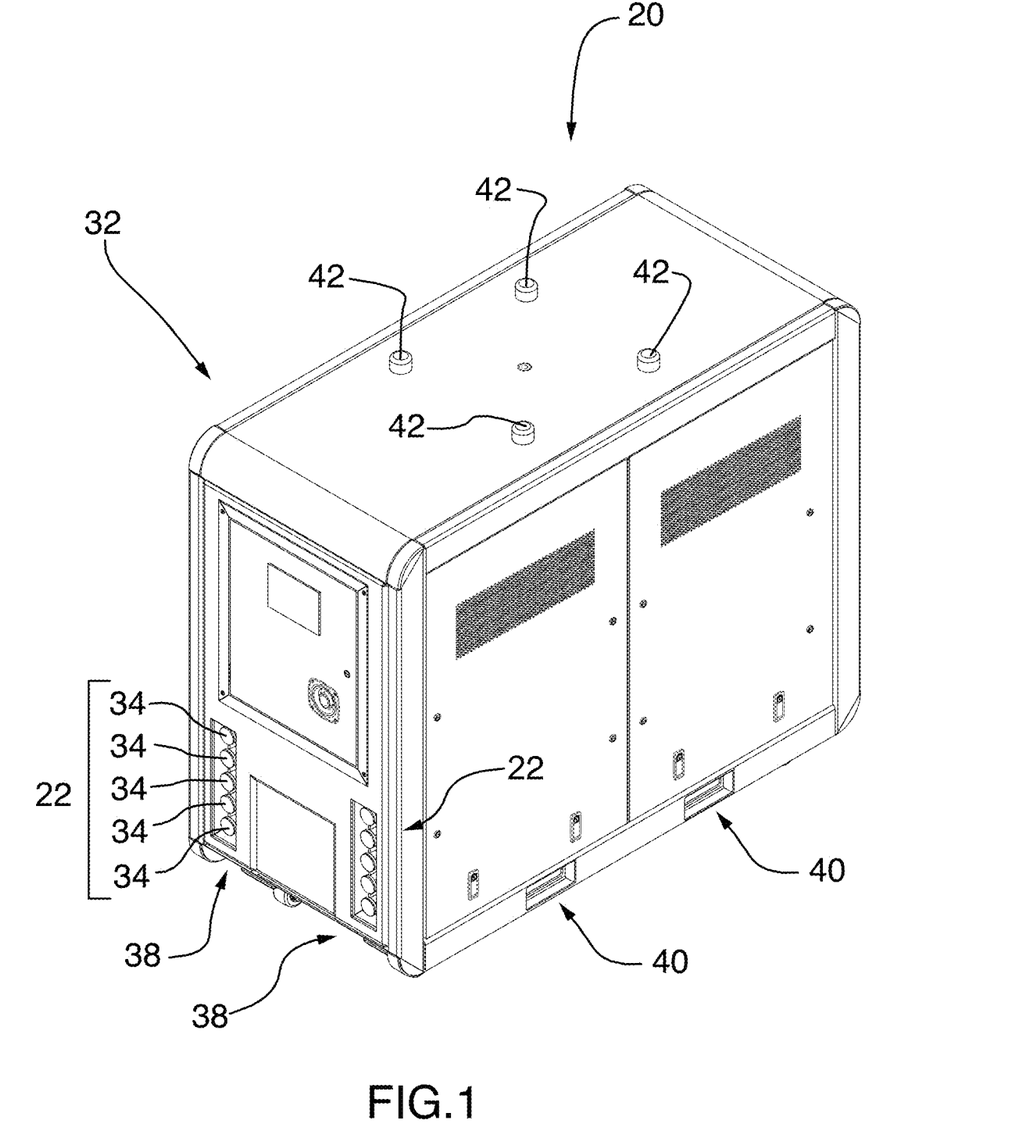
FIG. 1 is a front, top, right side view of apparatus according to an example embodiment of the invention.
Figure 2:
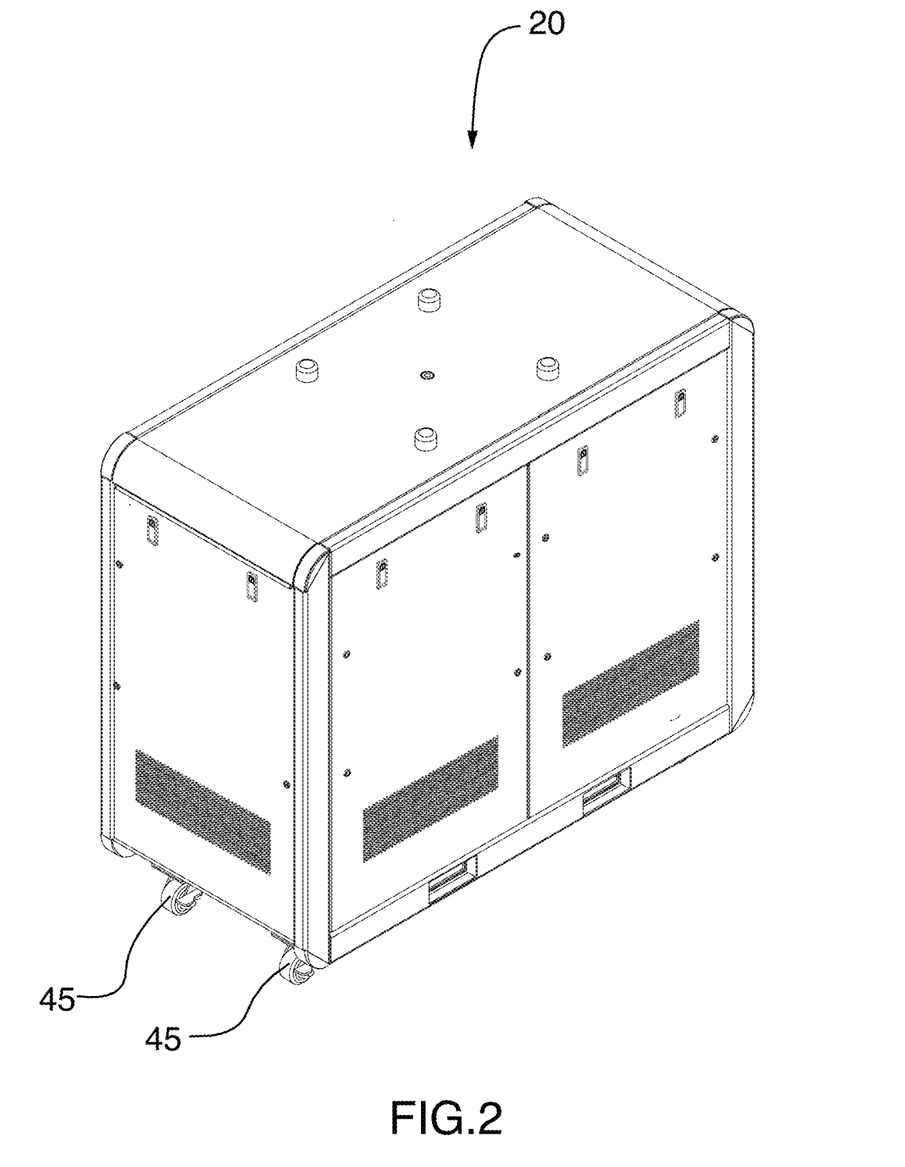
FIG. 2 is a front, rear, left side view of the apparatus of FIG. 1.

The controller is operatively coupled to the converter, battery, relay and terminal banks and includes a Touch Screen 34 and a Programmable Logic Controller 36. The controller is further described in subsequent paragraphs.

Figure 41:
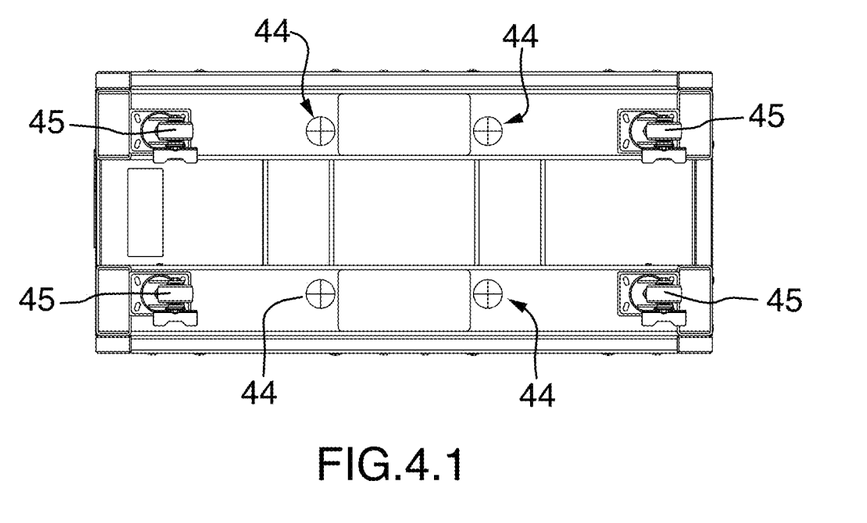

The base has a pair of longitudinal extending fork cavities 38 and a pair of laterally extending fork cavities 40 and is thereby adapted for engagement (not shown) by a lifting device selected from the group consisting of pallet truck and fork lift.

The shape is generally rectangular with a width of 32", a high of 63.5" and a length of 70", thereby to permit the apparatus to be transported by a fork lift or pallet truck through a conventional 36" wide and 80" high industrial doorway (not shown).

A notable departure from the rectangular profile are four upwardly projecting studs 42 at the top of the apparatus, four sockets 44 defined in the underside of the apparatus and four casters 45 on the underside of the apparatus.

Figure 5:
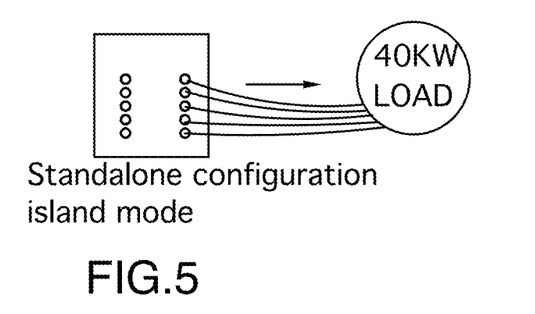
FIG. 5 is a schematic view of the apparatus of FIG. 1 in use with a 40 KW load.
Figure 6:
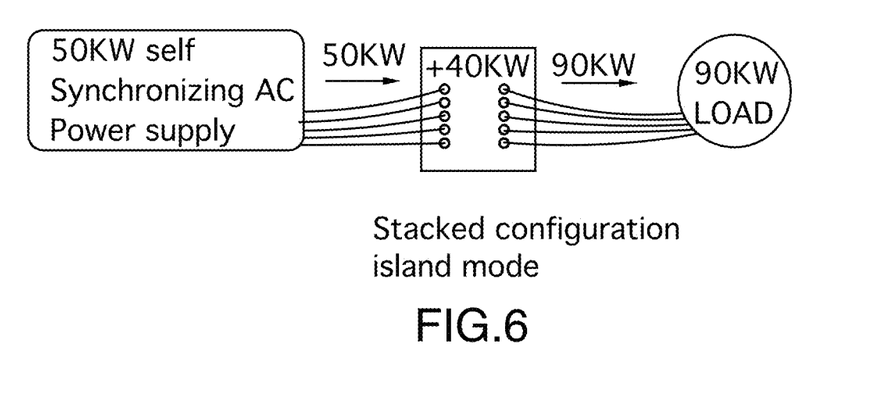
FIG. 6 is a schematic view of the apparatus of FIG. 1 in use with an external AC power supply and a 90 KW load.

The terminal banks, battery, converter, relay and controller will be understood to be operatively coupled to one another and configured for selective operation in one of a standalone configuration shown schematically in FIG. 5 and a stacked configuration shown schematically in FIG. 6

As seen in FIG. 5, in the standalone configuration, one of the pair of terminal banks defines an AC power supply using AC power generated by the converter and the other of the pair of terminal banks is isolated from the converter.

As seen in FIG. 6, in the stacked configuration, one of the pair of terminal banks is coupled to an external AC power supply and the other of the pair of terminal banks defines an AC power supply using AC power both generated by the converter and provided by the external AC power supply and having a load capacity equal to the maximum of: (a) the combined load capacity of the external AC power supply and the converter; and (b) a predetermined amperage rating of 400 A, this being defined by the relay and the internal bus of the apparatus.

The pair of terminal banks, battery, converter, relay and controller are operatively coupled to one another and configured when coupled to an external load and in each of the standalone configuration and the stacked configuration, for selective operation in one of:

a coupled mode, wherein the waveform of the AC power produced by the converter is synchronized by the controller responsive to the external load; and an island mode, wherein the waveform produced is independent of the external load.

In this regard, it will be evident that, in the standalone configuration of FIG. 5, the apparatus is in the island mode, since it is simply serving as a power supply to a simple 40 KW load.

It will further be evident that, in the stacked configuration of FIG. 6, the standalone apparatus is again in the island mode, since it is serving as a power supply to a simple 90 KW load.

Figure 7:
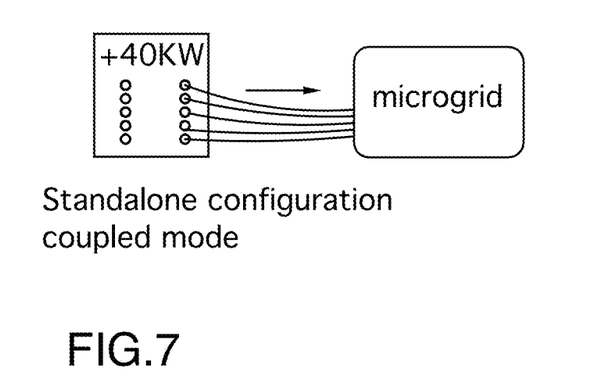
FIG. 7 is a schematic view of the apparatus of FIG. 1 in use with a microgrid.
Figure 8:
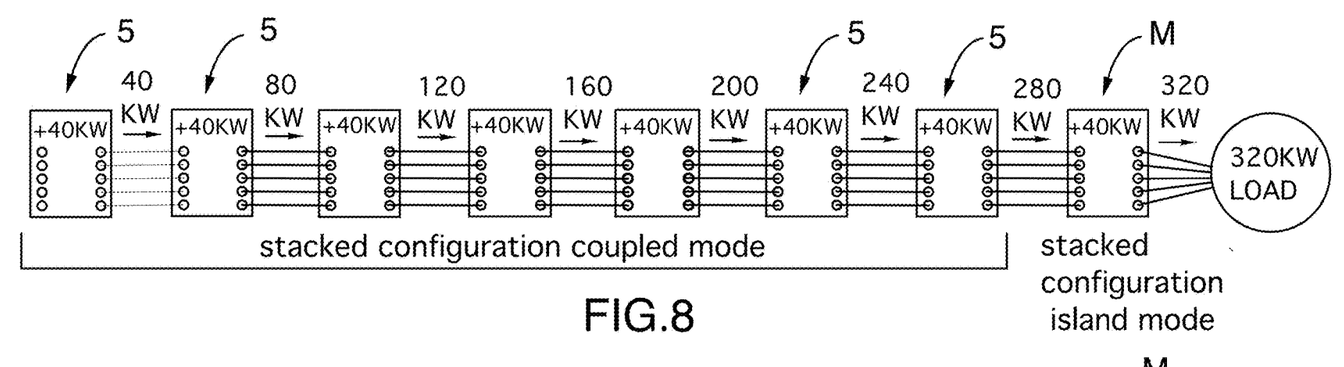
FIG. 8 is a schematic view of a plurality of the apparatus of FIG. 1 in use with a 320 KW load.
Figure 9:
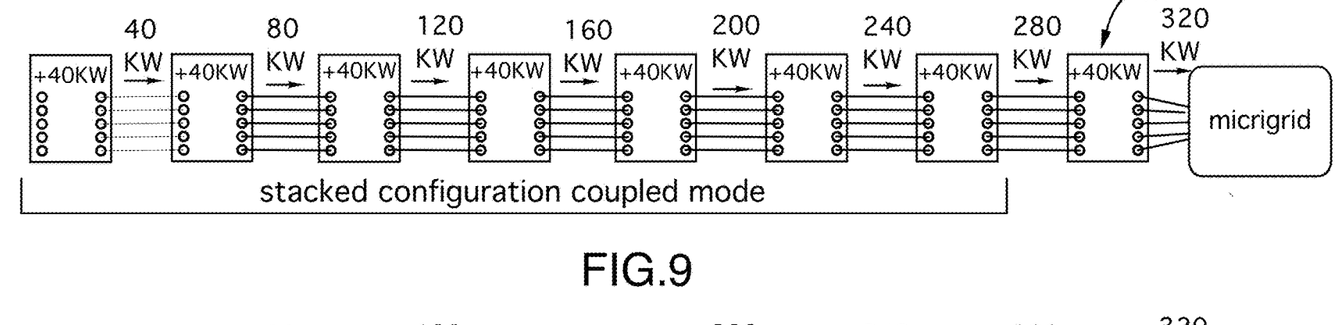
FIG. 9 is a schematic view of a plurality of the apparatus of FIG. 1 in use with a microgrid.

However, a further example of the standalone configuration is shown in FIG. 7; in this example, the apparatus is in the coupled mode, since it is delivering power to a microgrid and thus must synchronize therewith. Similarly, further examples of the apparatus in the stacked configuration and coupled mode are shown in FIG. 8 and FIG. 9.

These figures evidence further functionality of the apparatus, namely, the use of a plurality of the apparatus in power arrays.

Each power array shown is characterized by a master M and one or more slaves S.

Each of the slaves is connected to one other of the apparatus of the plurality to deliver power thereto and always operate in the coupled mode, the one other of the apparatus of the plurality to which said each is connected defining the external load to which the waveform is synchronized.

The master is that coupled to the external load, operates in the stacked configuration, receives power from the one or more slaves of the plurality and is adapted for selective operation in the coupled mode, when the load is a microgrid, and in the island mode, when the load is a simple load.

Controller

The controller is adapted such that each apparatus:
has a unique identifier;
has a functionality to permit user entry of a unique identifier using the touchscreen;
has an ADD SLAVE TO STACK functionality actuable by the touchscreen to enable the addition of a slave to a master, the ADD SLAVE TO STACK being disabled in respect of any slave in an array and further being automatically disabled in respect of a Master when the additional of a further apparatus to the array would result in the combined load capacities of the apparatus in the array exceeding the predetermined amperage rating.
has an REMOVE SLAVE FROM STACK functionality actuable from the touchscreen to enable the removal of a slave from a master, this functionality only being enabled in respect of a Master in an array.

According to another aspect, each apparatus can be adapted such that the controller enables the apparatus to permit
user assembly of two apparatus into a 2-unit power array by following the following steps:
operatively connecting the input terminals of an apparatus to be master to the output terminals of an apparatus to be slaved;
selecting the ADD SLAVE TO STACK functionality on the apparatus to be master; and entering the unique identifier of the apparatus to be slaved.
users addition of a slave to an array by following the following steps:
operatively connecting the output terminals of an apparatus to be added as slave to the input terminals of the last slave in the array;
selecting the ADD SLAVE TO STACK functionality on the apparatus to be master; and entering the unique identifier of the apparatus to be slaved.
user removal of a slave from an array by following the following steps:
selecting the REMOVE SLAVE FROM STACK FUNCTIONALITY on the Master; and disconnecting the output terminals of the last slave in the array.

Persons of ordinary skill will readily appreciate the advantage of the apparatus and system in that it renders it relatively easy to provide for temporary silent electrical power in a scalable manner without the need for labor skilled in the field of electrical circuitry design. The laborers are merely required to:
transport the apparatus to the desired location using whatever combination of fork lift, pallet lifter or casters is most appropriate (where space is at a premium, the apparatus can be stacked two high, with the studs and sockets providing for a secure arrangement)
plug the apparatus together using the cables and convenient cam-lock connectors;
as appropriate, fit the cables in the shrouds;
follow the simple computer prompted processes described above.

Figure 10:
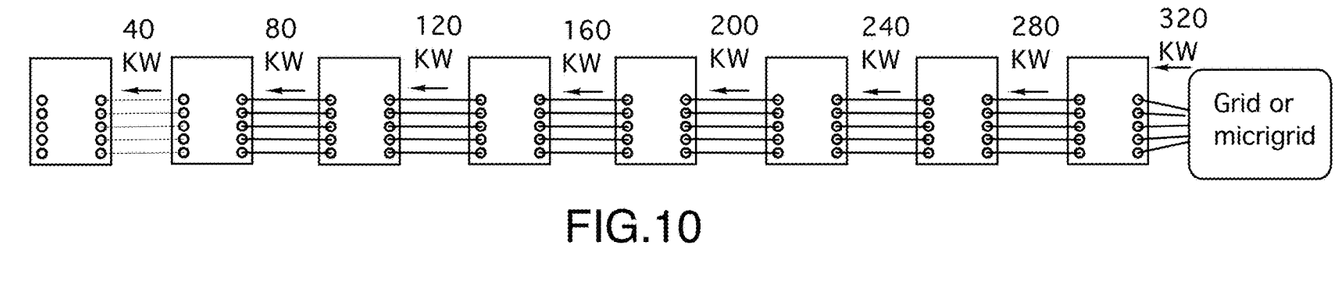
FIG. 10 is a schematic view of the structure of FIG. 9 being charged.

Of course, whereas the present disclosure is directed to the delivery of power, the apparatus can of course be charged individually (not shown) or as part of a charging array as shown in FIG. 10, wherein one of the plurality of the charging array is coupled to an external AC power supply and the others of the plurality of the charging array receive power from the one: the supplied AC will be converted to DC by the rectifiers.

Figure 11:
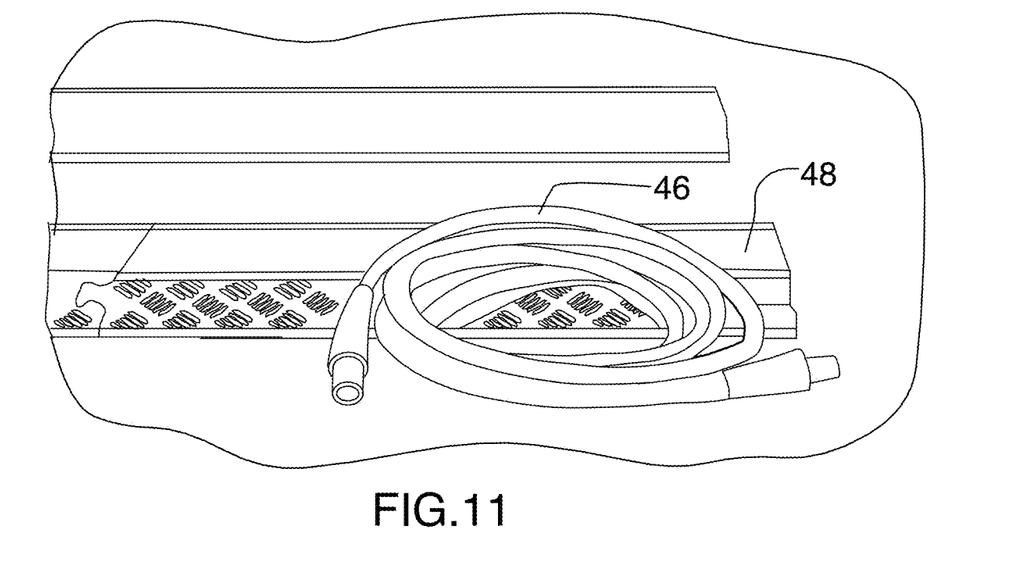
FIG. 11 is a view of components which, together with the apparatus, form part of an example system.
Figure 12:
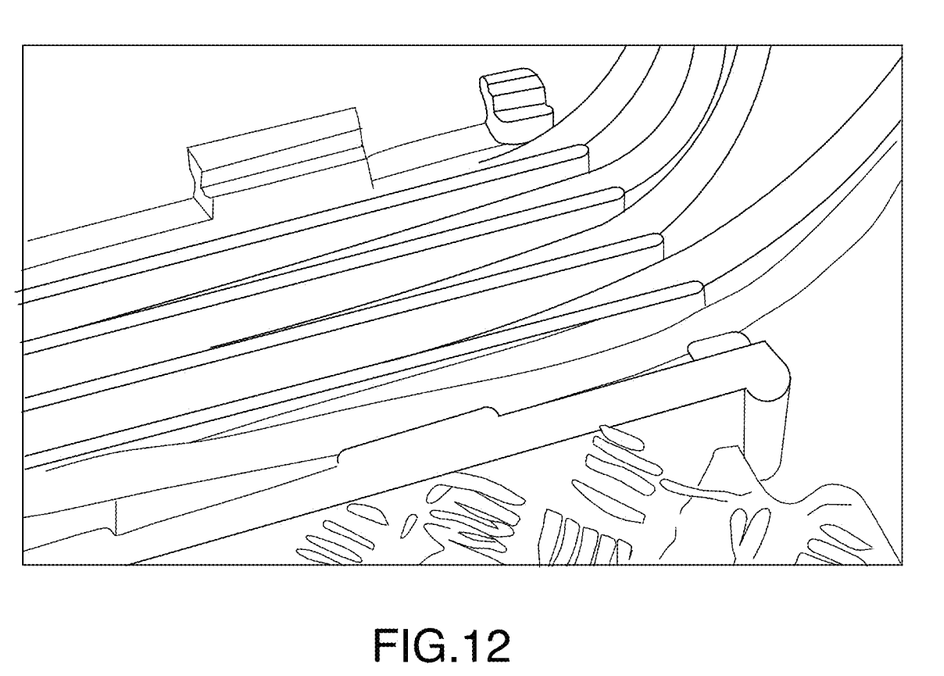
FIG. 12 is a view of the structure of FIG. 11 in use.

According to another example embodiment of the invention, the apparatus can form part of a system which includes cables 46 and cable shrouds 48 as shown in FIGS. 11 and 12, the cables each being rated for the predetermined amperage rating and adapted to provide for the apparatus forming the power array to be coupled to one another to form the power array, the shrouds adapted to protect cords from lightweight traffic when traversing traffic corridors.

Whereas in the figures, the array shows eight of the apparatus, it will be appreciated that arrays using the apparatus described can be constructed using as few as two and as many as 128 units. [1 master can control up to 127 slaves, limited to 400 amp per daisy-chain run which can be paralleled together through a distribution panel/similar to a max of 6,400 amps (128×7™'s at 50-amp output) controlled by one Master.]

Further, whereas a self-synchronizing AC power supply is shown in FIG. 6, the apparatus can be deployed in the arrangement of FIG. 6 with a simple AC generator; the PCS would sense the waveform differential and adjust itself to match.

Of course, variation is possible. Arrays of any number of apparatus could be produced, with suitable modification to the relays, internal buses and controllers. Similarly, whereas each apparatus is indicated to have a capacity of 40 KW and 50 A, this could vary with suitable modification to the battery, converter and controller.

Figure 13:
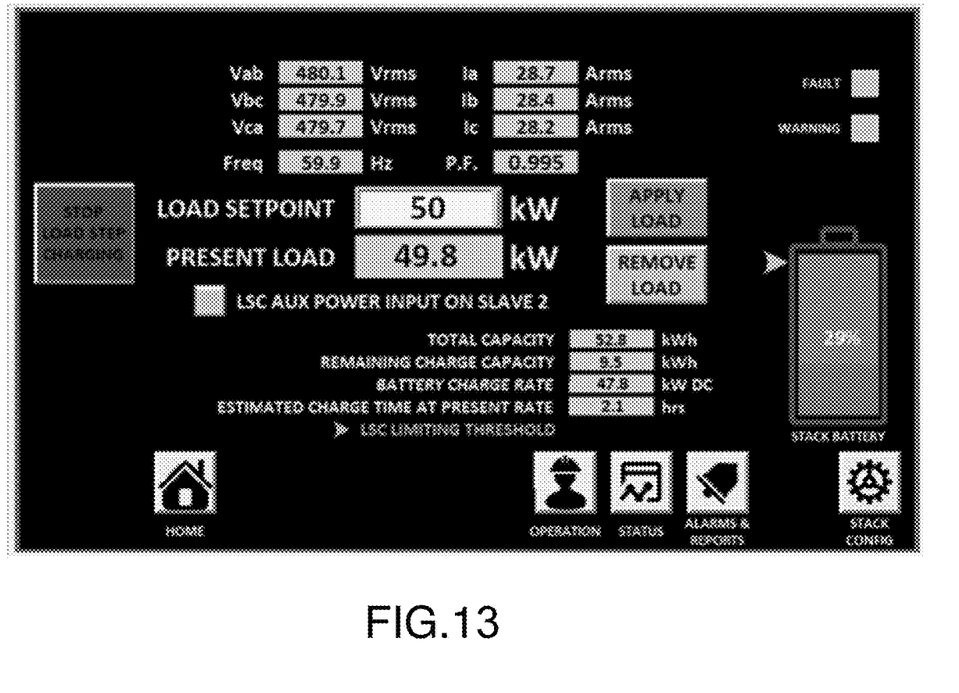
FIG. 13 is a view of a control screen.

A useful application of the charging functionality of FIG. 10 is in the context of load testing generators. By way of background, it is known to test electrical generators by exposing them to known loads, typically for predetermined periods of time. Because generators vary significantly in size, and in application, the loads applied need to vary. To achieve this, resistive loads are regularly used, since they are relatively easily varied. This creates significant waste heat and as such is environmentally undesirable. The modular nature of the example apparatus allows for electrical test loads up to about 320 kW to be created [each device can present a real power load of about 40 kW; eight devices in a chain can collectively present a real power load of about 320 kW.] The apparatus is adapted for load testing in one of two modes—Regular Charging and Load Step Charging. In either mode, a desired load [a load setpoint] is entered into the Master device. In Regular charging mode, the system charge is divided equally amongst those devices in the chain that are below full charge. In Load Step Charging mode, the system charge is divided amongst the devices such that, if the load is maintained, all of the batteries reach full charge at about the same time. As the duration of the generator test is within the control of the operator, this of course can be achieved, although it might require tests to be shorter or longer than typical. Persons of ordinary skill will readily appreciate the advantage associated with this, in that the devices can then be deployed, at full charge, to a site where power is required. An example control screen facilitating the above in shown in FIG. 13. Here, this screen shows a setpoint of 50 kW; hence, at least a chain of two devices must be used, since this exceeds the 40 kW rating of the example device. The screen usefully shows the estimated charge time remaining [2.1 hours being visible]. This is not necessary in terms of the present devices; they will automatically disconnect from the generator when full charge has been reached. However, it does help the operator know when to turn off the generator and avoid unnecessary idling time.

Yet further variations are possible. Accordingly, the invention should be understood to be limited only by the accompanying claims, purposively construed.

The invention claimed is:

1. An improved method for use with a generator, the method being of a type wherein said generator undergoes one or more load tests, each load test involving a connection of the generator to a predetermined electrical power load, the improvement comprising:
   a plurality of devices forming a chain of devices, each device comprising:
   a pair of terminal banks;
   a battery;
   a converter adapted to change DC power to AC power and further adapted
   to change AC power to DC power;
   a relay; and
   a controller,
   the plurality of devices being adapted for selective operation in a charging mode, wherein
   the device of the plurality of devices forming one end of the chain is connected to the generator and receives power therefrom;
   the other devices of the plurality of devices receive power from the device connected to the generator; and
   the predetermined electrical power load is defined by energy storage in the batteries of the devices.

2. The method of claim 1, wherein the plurality of the devices is adapted for selective operation in a mode wherein the power from the generator is divided amongst at least two of the devices and stored in the batteries at an equal rate.

3. The method of claim 1, wherein the plurality of the devices is adapted for selective operation in a moder where the power from the generator is divided amongst the devices such that, if the load is maintained, all of the batteries reach full charge at about the same time.

4. The method of claim 3, wherein the generator is run until the batteries are at full charge.

* * * * *